US011103776B2

(12) United States Patent
Chang et al.

(10) Patent No.: US 11,103,776 B2
(45) Date of Patent: Aug. 31, 2021

(54) EXTERNAL CONTROL DEVICE FOR GAME CONTROLLER AND GAME CONTROL DEVICE

(71) Applicant: ZEROPLUS TECHNOLOGY CO., LTD., New Taipei (TW)

(72) Inventors: Wen-Chung Chang, New Taipei (TW); Shih-Chung Chou, New Taipei (TW); Yi-Chun Shih, New Taipei (TW); Tsung-Chih Huang, New Taipei (TW)

(73) Assignee: Zeroplus Technology CO., LTD., New Taipei (TW)

( * ) Notice: Subject to any disclaimer, the term of this patent is extended or adjusted under 35 U.S.C. 154(b) by 0 days.

(21) Appl. No.: 16/740,860

(22) Filed: Jan. 13, 2020

(65) Prior Publication Data
US 2020/0222799 A1    Jul. 16, 2020

(30) Foreign Application Priority Data
Jan. 14, 2019 (TW) ................................ 108101365

(51) Int. Cl.
*A63F 13/24* (2014.01)
(52) U.S. Cl.
CPC .................... *A63F 13/24* (2014.09)
(58) Field of Classification Search
CPC .......... A63F 13/02; A63F 13/08; A63F 13/20; A63F 13/21; A63F 13/22; A63F 13/23;
(Continued)

(56) References Cited

U.S. PATENT DOCUMENTS

| 6,279,906 B1 * | 8/2001 | Sanderson | ............... A63F 13/02 273/148 B |
| 2006/0172802 A1 * | 8/2006 | Hussaini | ............... A63F 13/235 463/39 |

(Continued)

FOREIGN PATENT DOCUMENTS

JP        H0631057 A      2/1994

OTHER PUBLICATIONS

Baburin, Operate Switch and PS4 with Xbox One controller! "Brook X One Adapter" Review, Mar. 14, 2018, 7 pages.
(Continued)

*Primary Examiner* — Omkar A Deodhar
(74) *Attorney, Agent, or Firm* — Tracy M Heims; Apex Juris, pllc.

(57) ABSTRACT

An external control device for a game controller is provided, including a casing, a second adapter, a mode selector, a memory, and a conversion circuit. The second adapter is provided for being connected to the first adapter of the game controller. The mode selector is provided for outputting one of selection signals. The memory stores different encode data. The conversion circuit selects encode data according to the selection signals output from the mode selector, and encodes and converts the button signal into a pre-formatted wireless signal according to the selected encode data, and then sends the pre-formatted wireless signal through a wireless signal transmitting circuit. Thus, the button signal of the game controller is converted into a wireless signal corresponding to another game console providing another game control device integrating the game controller with the external control device, which has the same effect.

11 Claims, 12 Drawing Sheets

(58) Field of Classification Search
CPC ........ A63F 13/235; A63F 13/24; A63F 13/25; A63F 13/30; A63F 13/327; A63F 13/332; A63F 13/90; A63F 2300/10; A63F 2300/1018; A63F 2300/1025; A63F 2300/1043; A63F 2300/1056; A63F 2300/204
See application file for complete search history.

(56) References Cited

U.S. PATENT DOCUMENTS

2010/0041480 A1* 2/2010 Wong ................. A63F 13/06 463/37
2013/0324236 A1* 12/2013 Koppe ................ A63F 13/06 463/29

OTHER PUBLICATIONS

Office Action for JP2020-003631, dated Dec. 22, 2020, Total of 4 pages.
English Abstract for JPH0631057, Total of 1 page.
English Abstract for Operate Switch and PS4 with Xbox One controller, Total of 1 page.

* cited by examiner

EXTERNAL CONTROL DEVICE FOR GAME CONTROLLER AND GAME CONTROL DEVICE

BACKGROUND OF THE INVENTION

1. Technical Field

The present invention relates generally to a game controller, and more particularly to an external control device and a game control device, wherein the external control device applies to a variety of different game consoles and can be installed on a game controller.

2. Description of Related Art

As the market for video games continues to expand, companies including Microsoft, Nintendo, and Sony have also launched a number of popular video games and video game console platforms. Generally, the game controllers of each game console are not interoperable, so players must operate the exclusive game controller for the specific game console to start the game. For example, when playing XBOX ONE, players must use a game controller suitable for XBOX ONE series consoles, while when playing PS4, players must use a game controller suitable for PS4 series consoles, so as to successfully operate and control the game.

However, if players want to play another game with a different game console, they must change the game controller, which is very inconvenient for players. For example, after players have adapted to the operation of the game controller of XBOX, if they want to play PS4, they have to readjust to the operation mode of the game controller of PS4, which causes players inconvenience. Moreover, if the game controller of any type of game consoles is damaged or lost, there would be a great expense for players to re-purchase a game controller which only applies to a specific game console.

Furthermore, a game controller is equipped with a storage battery to supply electricity. Nevertheless, the storage battery has a limited power storage capacity so that for hardcore users, the power of the storage battery will be insufficient. As the storage battery has been charged and discharged more frequently, its storage capacity will degrade and consequent replacing the storage battery or purchase of a new game controller would incur time and expense to maintain.

BRIEF SUMMARY OF THE INVENTION

In view of the above, the primary objective of the present invention is to provide an external control device for a game controller and a game control device for different game consoles.

Another objective of the present invention is to provide an external control device for a game controller which supplies power to a storage battery inside the game controller.

The present invention provides an external control device for a game controller, wherein the game controller includes a control circuit, a first adapter, and a plurality of buttons, wherein the control circuit is electrically connected to the first adapter and the plurality of buttons; according to a stressed state of each of the buttons, the control circuit generates a button signal corresponding to each of the buttons. The external control device includes a casing, a second adapter, a mode selector, a memory, and a conversion circuit. The second adapter is provided on the casing for being connected to the first adapter. The mode selector is provided on the casing for users to operate so as to send one of a plurality of selection signals which are different. The conversion circuit is provided in the casing and electrically connected to the second adapter, the mode selector, and the memory, wherein the conversion circuit is electrically connected to the control circuit through the first adapter and the second adapter so as to receive the button signal corresponding to any of the buttons from the control circuit. According to one of the selection signals sent by the mode selector, the conversion circuit selects one of the encode data, and then encodes and converts the button signal which is received into a pre-formatted wireless signal according to the encode data which is selected, and finally sends the pre-formatted wireless signal through a wireless signal transmitting circuit.

The external control device for the game controller includes a battery provided in the casing, wherein the battery is electrically connected to the conversion circuit and the second adapter. The battery supplies power to the conversion circuit. The power of the battery is output through the second adapter, and forms an external electric power for charging a storage battery in the game controller.

Moreover, the present invention provides a game control device including a case, a plurality of buttons, a control circuit, a mode selector, a memory, and a conversion circuit. The plurality of buttons are provided in the case. The control circuit is provided in the case and is electrically connected to the plurality of buttons. The control circuit generates a button signal corresponding to each of the buttons according to a stressed state of each of the buttons. The mode selector is provided on the case for users to operate so as to output one of a plurality of selection signals which are different. The memory is provided in the case for storing a plurality of encode data. The conversion circuit is provided in the case, and is electrically connected to the control circuit, the mode selector, and the memory. The conversion circuit receives the button signal corresponding to any of the buttons from the control circuit. The conversion circuit selects one of the encode data in the memory according to one of the selection signals output from the mode selector, and encodes and converts the button signal which is received into a pre-formatted wireless signal according to the encode datum which is selected, and then sends the pre-formatted wireless signal through a wireless signal transmitting circuit.

The effect of the present invention is that the external control device is able to convert the button signal of the game controller into the wireless signal which corresponds to another game console. Thus, a player can operate the habitual game controller to play games with different game consoles, which makes the operation in the games easier. Furthermore, the battery of the external control device can be the external electric power to charge the storage battery of the game controller for longer battery life. Even if the storage battery is aging, the battery of the external control device can supply power to the storage battery. In addition, the game control device is also able to output wireless signals which correspond to different game consoles.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

As shown in FIG. 1 to FIG. 5, the first preferred embodiment of the present invention, an external control device 1, is detachably installed on a game controller 100.

Figure 1:
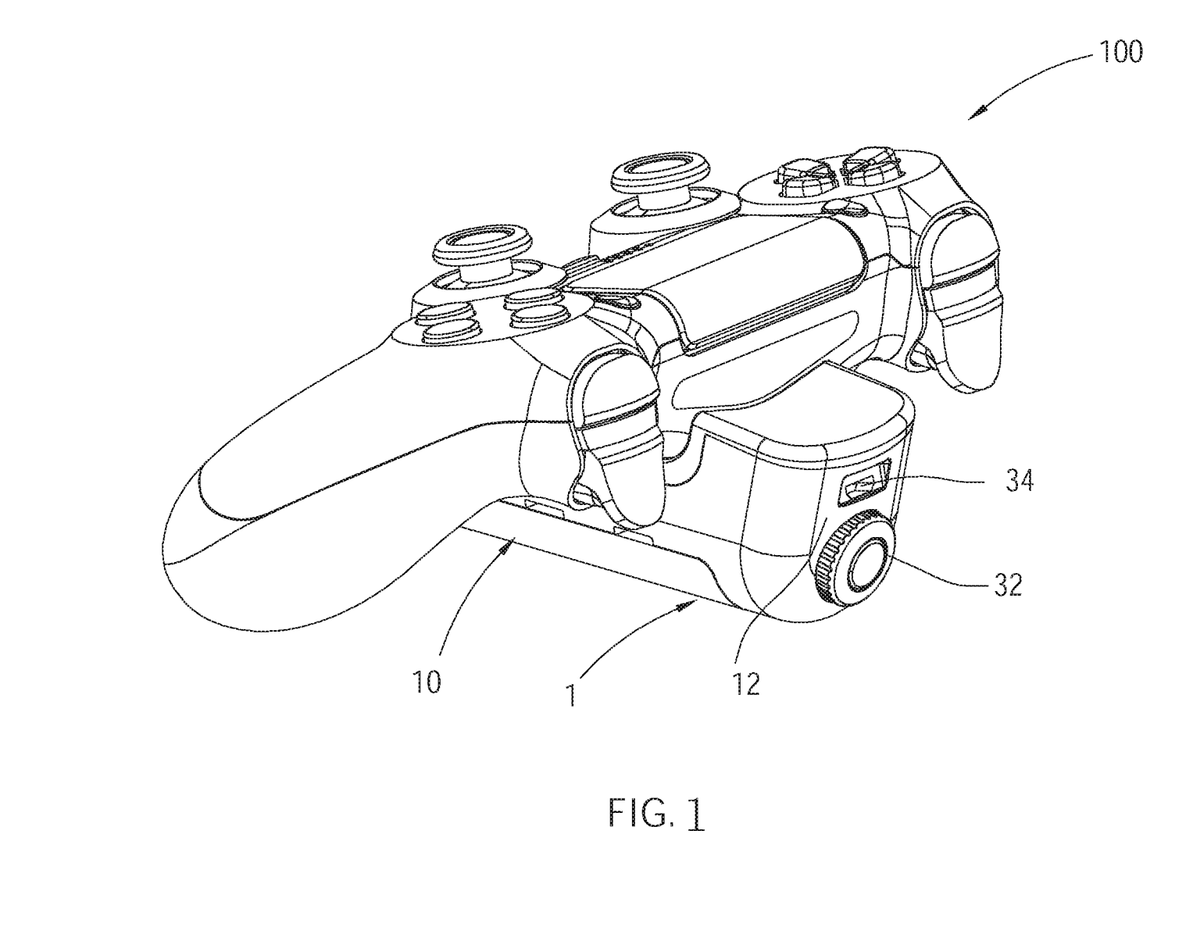
FIG. 1 is a perspective view of the external control device of the first preferred embodiment of the present invention, which is installed on a game controller.
Figure 2:
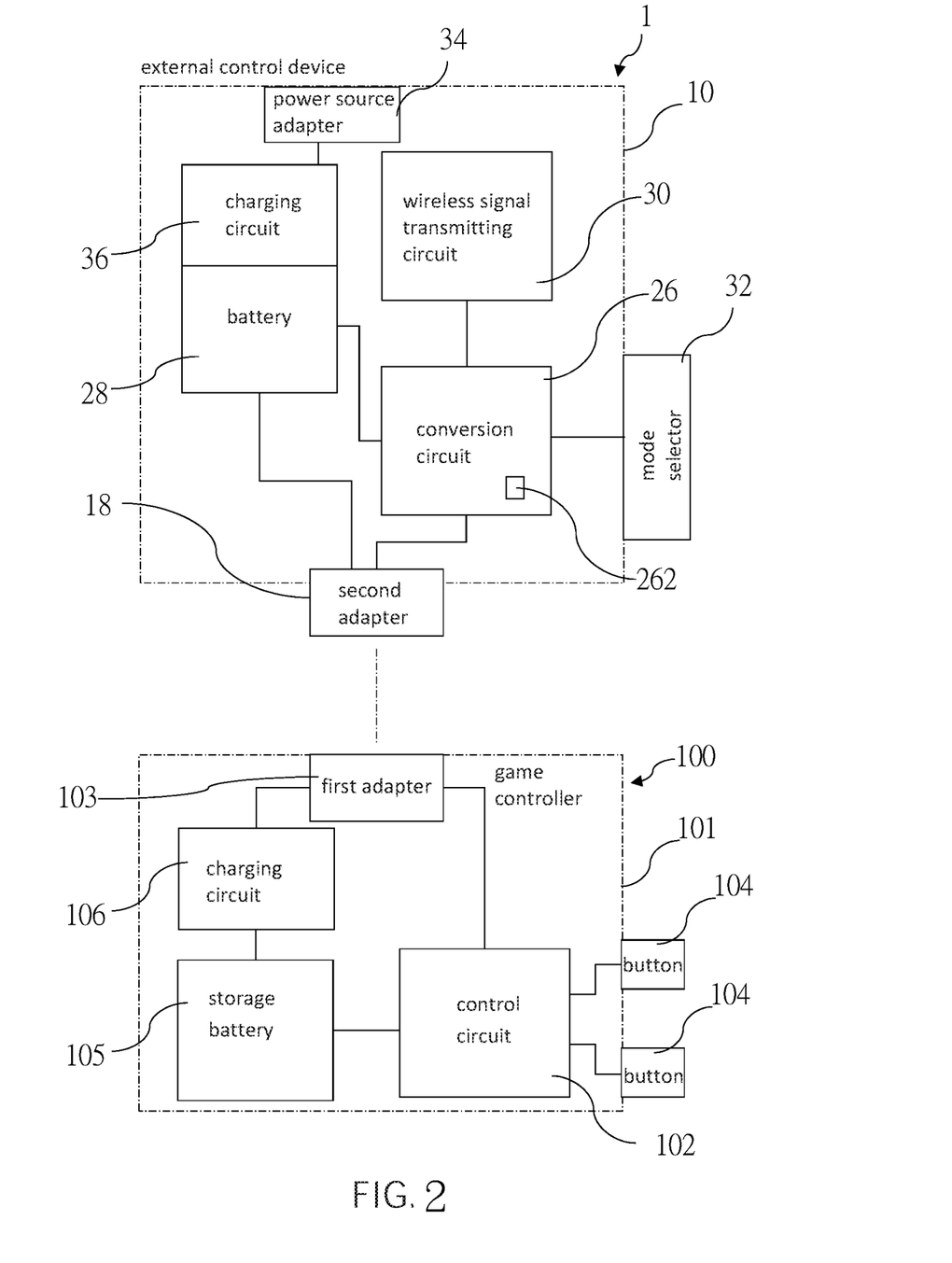
FIG. 2 is a block diagram of the external control device and the game controller in FIG. 1.
Figure 3:
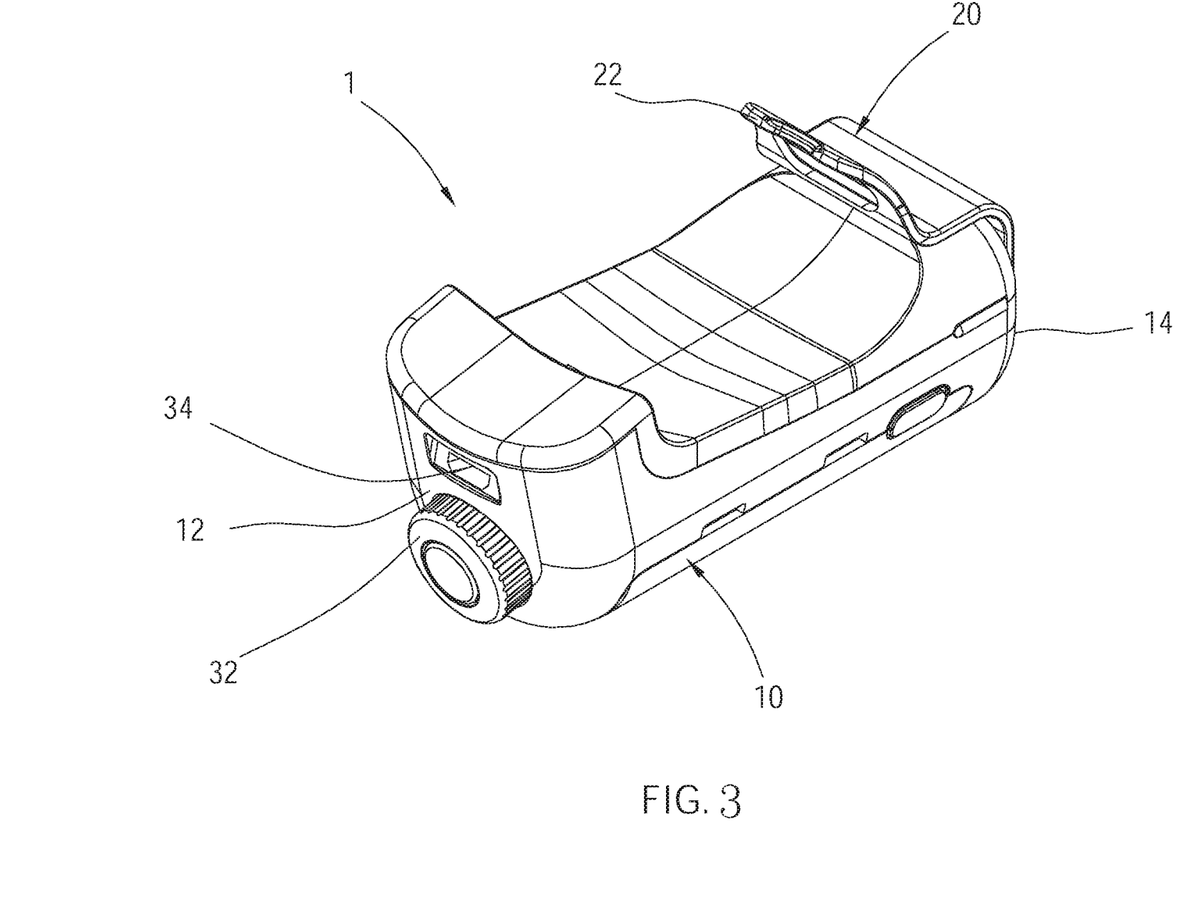
FIG. 3 is a perspective view of the external control device in FIG. 1.
Figure 4:
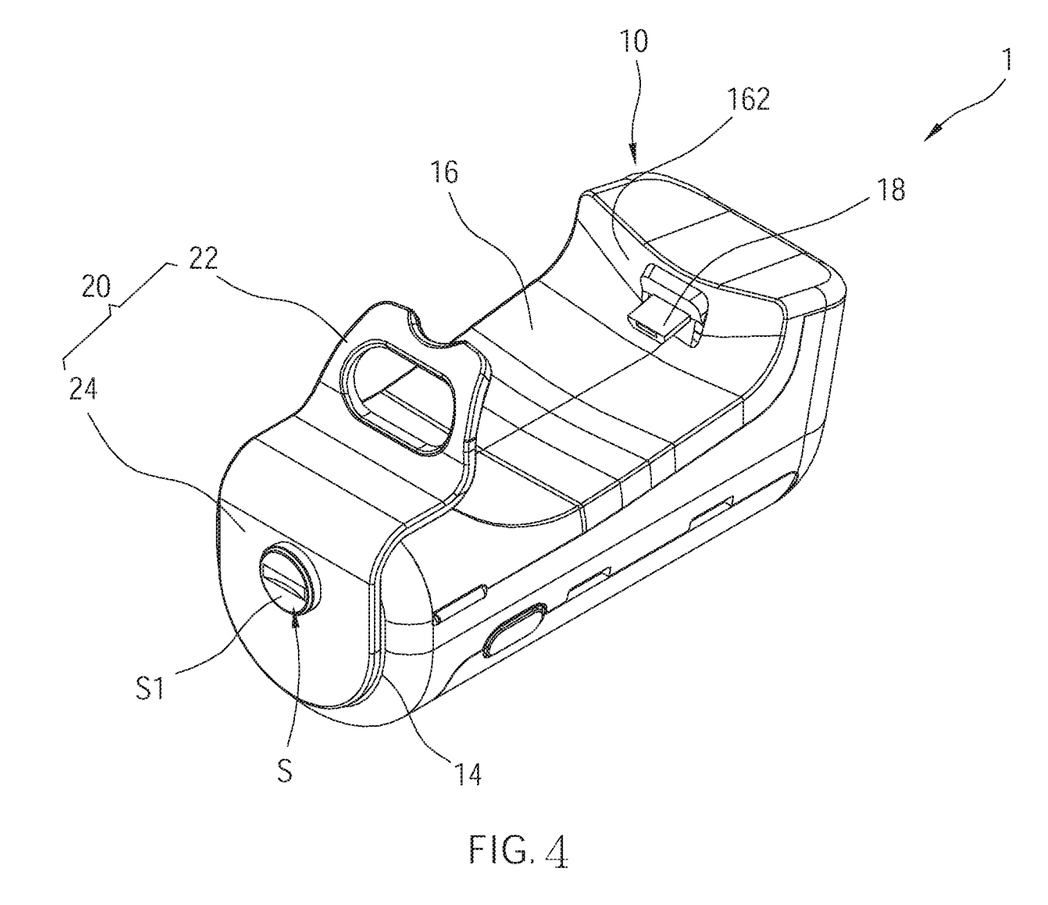
FIG. 4 is a perspective view of the external control device from the opposite side of FIG. 3.
Figure 5:
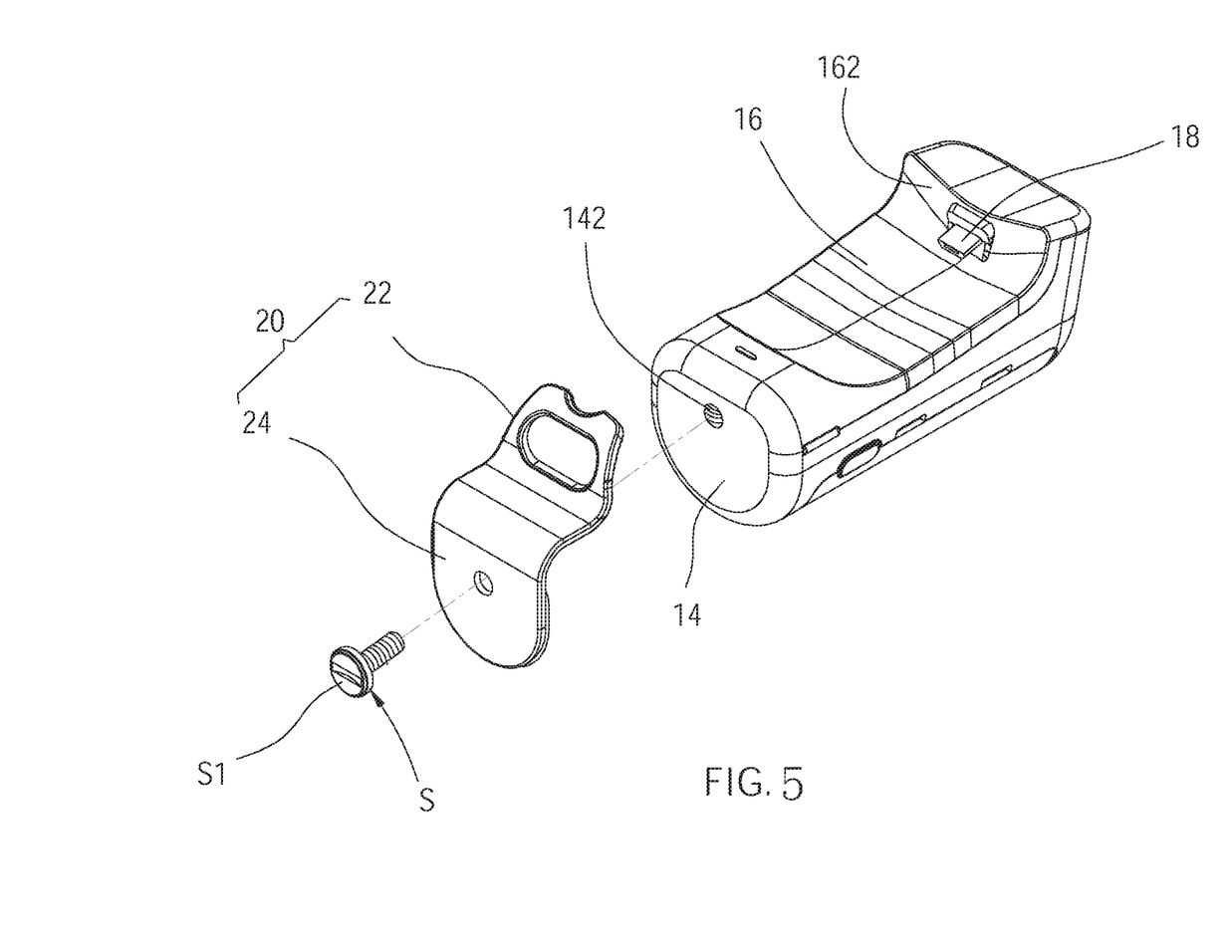
FIG. 5 is an exploded view of the external control device in FIG. 1.

Referring to FIG. 2, the game controller 100 includes a case 101, and a control circuit 102, a first adapter 103, a plurality of buttons 104, and a storage battery 105, which are provided in the case 101. The control circuit 102 is electrically connected to the first adapter 103, the buttons 104, and the storage battery 105, wherein the storage battery 105 supplies power to the control circuit 102. The first adapter 103 is electrically connected to the storage battery 105 and is provided for receiving external electric power to charge the storage battery 105. In this embodiment, the first adapter 103 is a female connector, wherein the external electric power inputting to the first adapter 103 charges the storage battery 105 through a charging circuit 106; the first adapter 103 can also be connected to a power supply (not shown). A part of each of the buttons 104 is exposed to the exterior of the case 101. According to a stressed state of each of the buttons 104, the control circuit 102 generates a button signal corresponding to each of the buttons 104. The button signal includes a button information which represents the stressed state of the corresponding button. The button signal can be wirelessly encoded with a specific communication protocol, and then be sent to a game console corresponding to the game controller, e.g., PS4. Or alternatively, the button signal can be output through the first adapter 103 in a wired way. Each of the buttons 104 is not limited to a concrete button, and can be a virtual button displayed on a touch screen.

The external control device 1 includes a casing 10, a second adapter 18, a clamping member 20, a conversion circuit 26, a battery 28, and a mode selector 32. In this embodiment, the casing 10 is elongated, and has a front end 12 and a rear end 14. A recess 16 is recessed from the top between the front end 12 and the rear end 14, and has a recess wall 162 back to the front end 12. The second adapter 18 is provided on the casing 10, and is a male connector. The second adapter 18 protrudes from the recess wall 162 of the recess 16 and stretches to the rear end 14. The second adapter 18 is provided to be inserted by the first adapter 103 of the game controller 100, which makes the first adapter 103 and the second adapter 18 connected.

The clamping member 20 is connected to the casing 10. In this embodiment, the clamping member 20 is detachably connected to the rear end of the casing 10. The clamping member 20 has a stop portion 22 which is opposite to the recess wall 162 of the recess 16 of the casing 10. Moreover, the stop portion 22 is a slanted plate which stretches above the recess 16. The stop portion 22 is provided to clamp the case 101 of the game controller 100 along with the recess wall 162. More specifically, the clamping member 20 has a joint portion which has a perforation 242, and the rear end 14 of the casing 10 has a screw hole 142. The clamping member 20 is fixed to the casing 10 by a screw S which passes through the perforation 242 of the joint portion 24 and then is fastened to the screw hole 142, wherein the head Si of the screw S abuts against the joint portion 24, so that the axis of the screw S is parallel to the stretching direction of the second adapter 18. Thus, the distance between the stop portion 22 and the recess wall 162 can be adjusted by screwing in or screwing off the screw, so as to install the external control device 1 on the bottom of the case of the game controller, or to detach the external control device 1 from the game controller 100.

The conversion circuit 26 is provided in the casing 10, and is electrically connected to the second adapter 18. After the second adapter 18 and the first adapter 103 are connected, the conversion circuit 26 is electrically connected to the control circuit 102 through the second adapter 18 and the first adapter 103. Furthermore, the conversion circuit 26 sends a request command to request the control circuit 102 to output the button signal through the first adapter 103 in a wired way, instead of outputting the button signal wirelessly. After any of the buttons 104 of the game controller 100 is pressed, the control circuit 102 sends the button signal corresponding to the pressed button 104 to the conversion circuit 26. After the conversion circuit 26 receives the button signal which is output from the control circuit 102, the conversion circuit 26 converts the button signal into a pre-formatted wireless signal, and sends out the pre-formatted wireless signal through a wireless signal transmitting circuit 30. The pre-formatted wireless signal corresponds to another type of game console, e.g., XBOX, PC, Nintendo SWITCH, smart phone, or tablet.

The battery 28 is provided in the casing 10, and is electrically connected to the conversion circuit 26 and the second adapter 18. The battery 28 is provided to supply power to the conversion circuit 26 for operation. In addition, the power of the battery 28 is output through the second adapter 18. After the second adapter 18 is connected to the first adapter 103, the power of the battery 28, which is output through the second adapter 18, forms the external electric power for charging the storage battery 105 of the game controller 100.

In order to enable the conversion circuit 26 to output wireless signals corresponding to different game consoles, the mode selector 32 is provided sat the front end of the casing 10, and is electrically connected to the conversion circuit 26. The mode selector 32 outputs one of a plurality of different selection signals upon users' operation, wherein each of the selection signals corresponds to one type of game consoles, e.g., PS4, XBOX one, PC, Nintendo SWITCH, smart phone, or tablet. The mode selector 32 can be a rotary switch or an encoder. A memory 262 is provided in the conversion circuit 26 and is electrically connected to the conversion circuit 26 for storing a plurality of types of encode data, wherein each of the encode data corresponds to the communication protocol of one type of the game consoles. According to one of the selection signals which is output from the mode selector 32, the conversion circuit 26 selects one of the encode data, and then according to the selected encode data, the conversion circuit 26 encodes and converts the received button signal into the pre-formatted wireless signal of one of the game consoles. In this way, players can select one of the game consoles they want to control through the mode selector 32, and accordingly, the conversion circuit 26 can encode and convert the corresponding button signal into wireless signal, and then send the wireless signal to the game console they want to control. Practically, the memory 262 can also be independent of the conversion circuit 26, and is electrically connected to the conversion circuit 26.

In order to allow the battery of the external control device 1 to be repeatedly used, the battery of the external control device 1 of this embodiment is a storage battery. In addition, the external control device 1 includes a power source adapter 34 which is a female connector and provided at the front end 12 of the casing 10. The power source adapter 34 is provided for being inserted by an exterior power supply so as to receive the power from the outside as well as to charge the battery 28 through the charging circuit 36.

In this way, the external control device 1 in this embodiment can convert the button signal of the game controller into the wireless signal corresponding to another different game console, and provide additional power to the storage battery 105 of the game controller 100. The game controller 100 and the external control device 1 form a game control device.

Practically, it is not necessary to install the battery 28 in the external control device. For example, the storage battery 105 inside the game controller 100 can supply power to the external control device.

Figure 6:
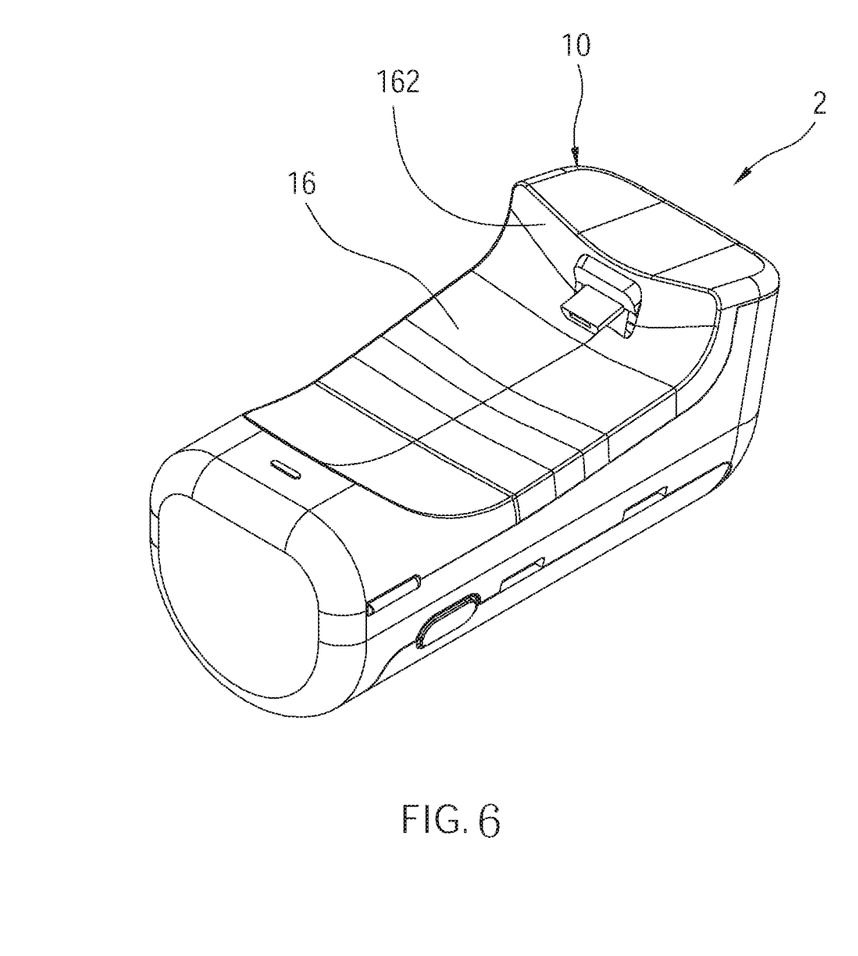
FIG. 6 is a perspective view of the external control device of the second preferred embodiment of the present invention.

As shown in FIG. 6, the second embodiment, an external control device 2, has a structure that is substantially the same as the first embodiment. The difference between the two embodiments is that the external control device 2 doesn't include the clamping member. In the second embodiment, after the second adapter 18 and the first adapter 103 are connected, the recess wall 162 of the recess 16 of the casing 10 abuts against the case 101 of the game controller 100.

Figure 7:
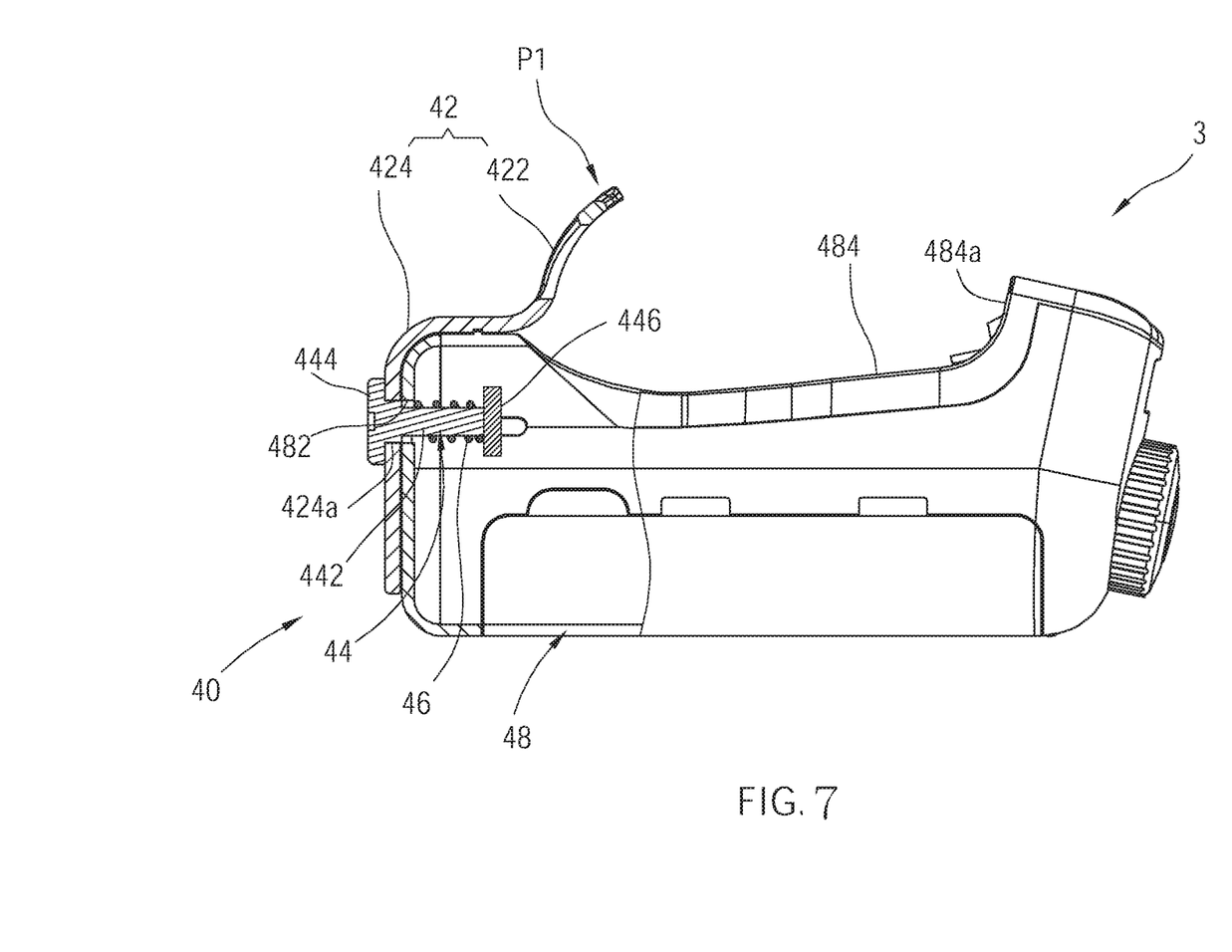
FIG. 7 is a partially sectional view of the external control device of the third preferred embodiment of the present invention.

As shown in FIG. 7, the third embodiment, an external control device 3, has a structure that is substantially the same as the first embodiment. The difference between the two embodiments is that the clamping member 40 in the third embodiment is movable relative to a recess wall 484a of a recess 484 of a casing 48, and can move between a first position P1 and a second position P2. When the clamping member 40 is located in the first position P1, the stop portion 422 and the recess wall 484a hold the case 101 of the game controller 100 together so as to fix the external control device 3 to the case 101 of the game controller 100. When the clamping member 40 is located in the second position P2, the stop portion 422 is spaced from the case 101 so as to install the external control device 3 on the case of the game controller 100, or to detach the external control device 3 from the case of the game controller 100.

Figure 8:
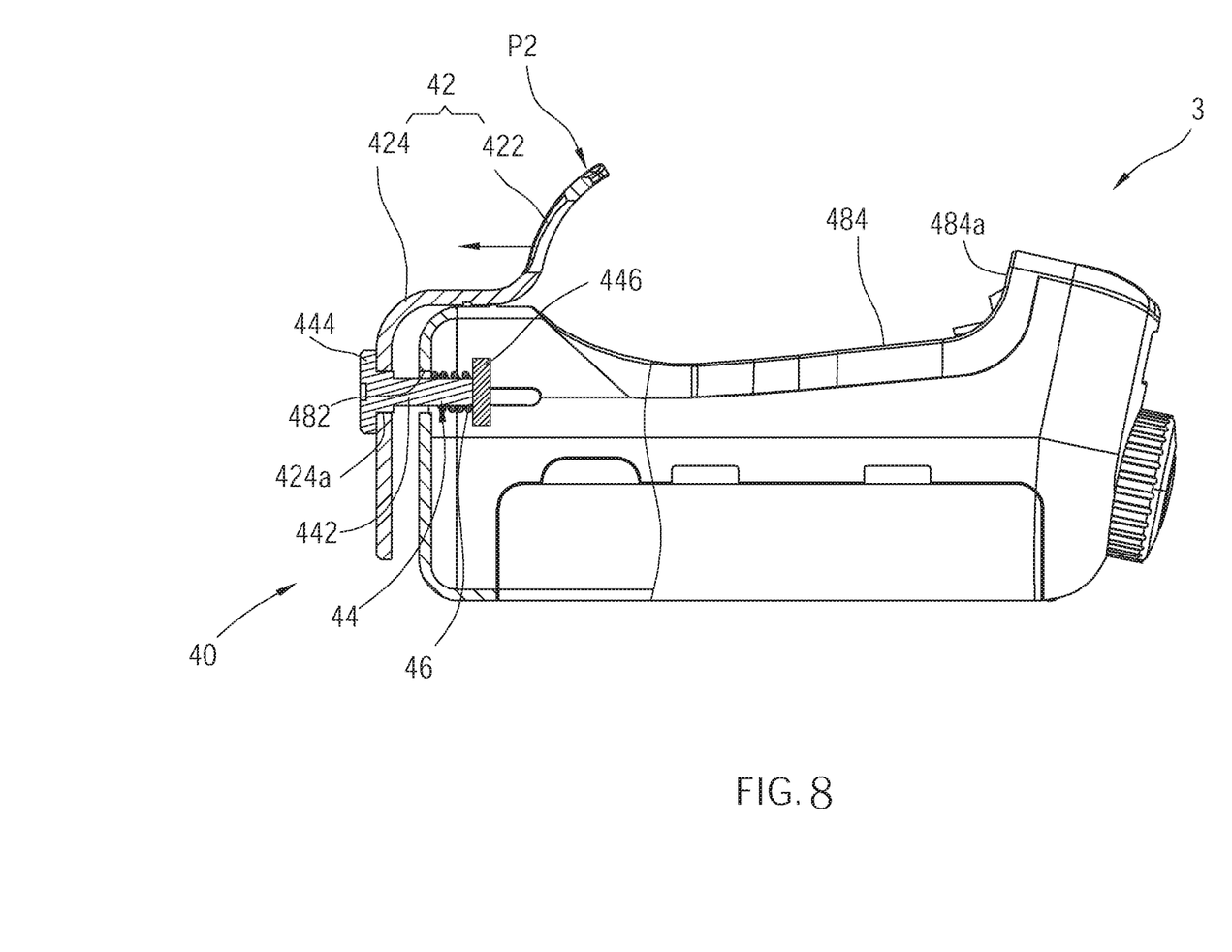
FIG. 8 is a schematic diagram of the clamping member in FIG. 7, which is in the second position.

More specifically, the casing 48 in this embodiment has a penetration hole 482; the clamping member 40 includes a clamping piece 42 and a shaft rod 44. The clamping piece 42 has a stop portion 422 and a joint portion 424, wherein the joint portion 424 has a perforation 424a which corresponds to the penetration hole 482. A rod body 442 of the shaft rod 44 passes through the perforation 424a of the clamping piece 42 as well as the penetration hole 482 of the casing 48 so as to stick in the casing 48. A head at the outer end of the shaft rod 44 abuts against the joint portion 424 of the clamping piece 42, while the shaft rod 44 includes a block portion 446 at the inner end thereof. Additionally, a return spring 46 is fitted around the rod body 442 of the shaft rod 44, wherein an end of the return spring 46 abuts against the block portion of the shaft rod 44, while the other end of the return spring 46 abuts against the inner wall of the casing 48. By this design, when the clamping member 40 is pulled by an external force and located in the second position P2 (as shown in FIG. 8), the return spring 46 is compressed. At this time, the external control device 3 can be installed on or be detached from the case 101 of the game controller 100. After the external force is removed, the return spring 46 drives the clamping member 40 back to the first position P1 so as to fix the external control device 3 to the case of the game controller.

Figure 9:
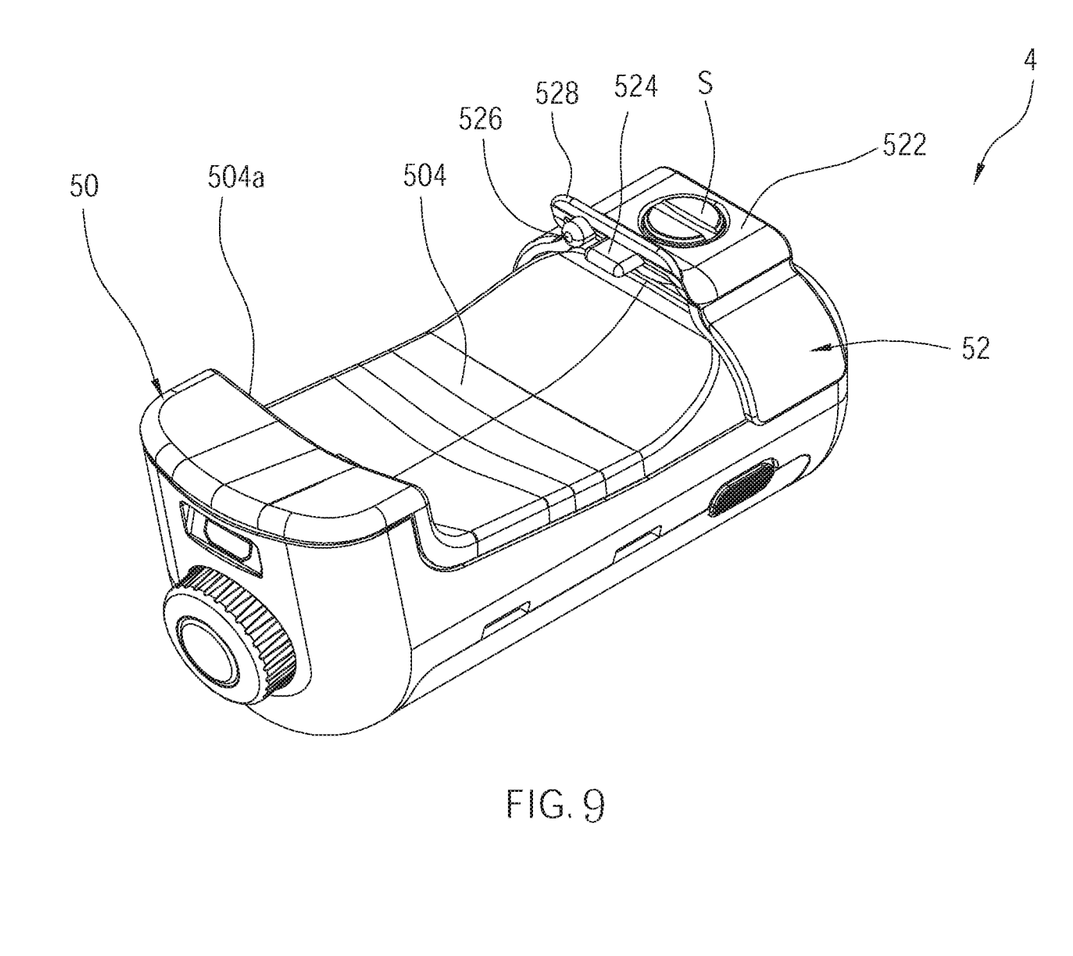
FIG. 9 is a perspective view of the external control device of the fourth preferred embodiment of the present invention.
Figure 10:
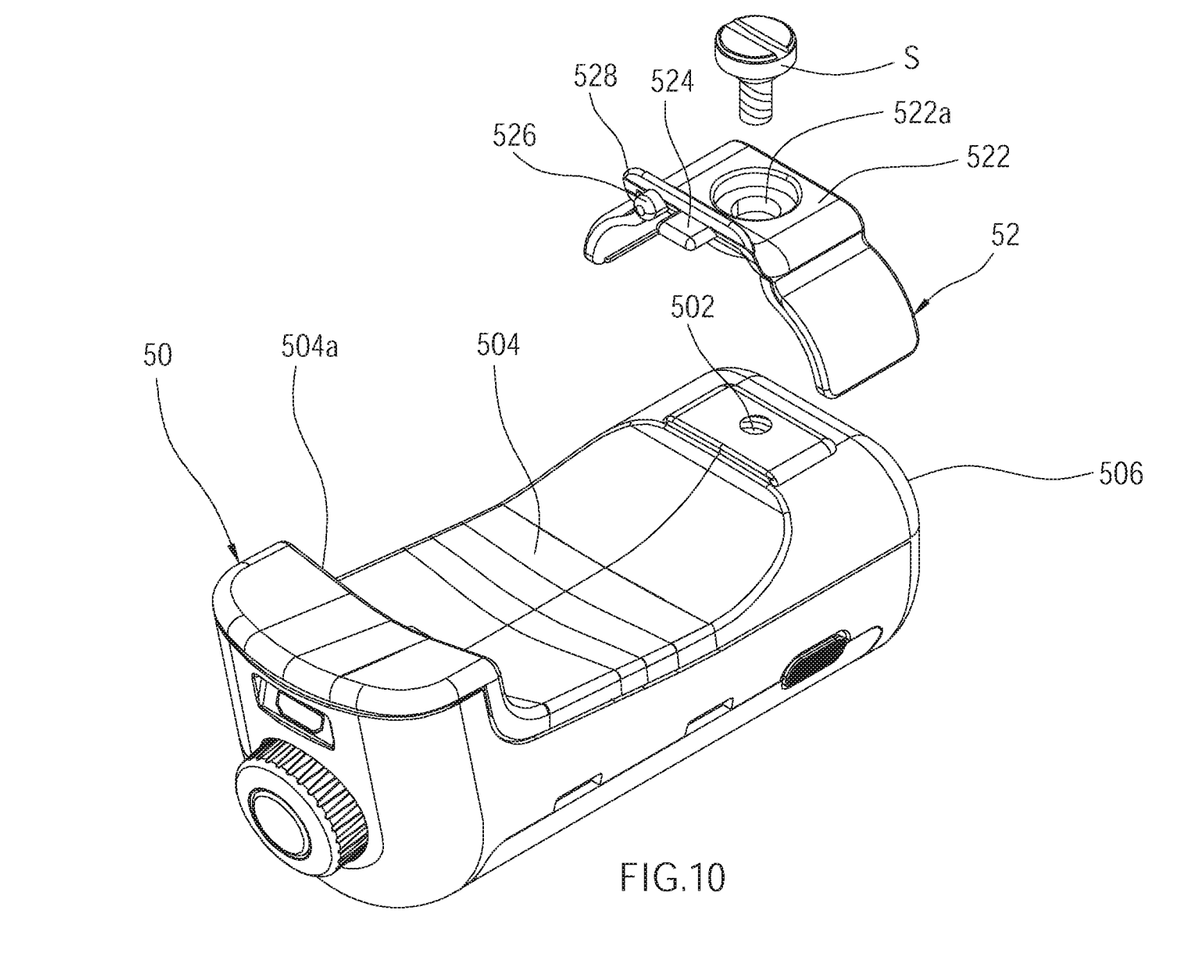
FIG. 10 is an exploded view of the external control device in FIG. 9.

As illustrated in FIG. 9 and FIG. 10, the fourth embodiment, an external control device 4, has a structure that is substantially the same as the first embodiment. The difference between the two embodiments is that the screw hole 502 of the casing in the fourth embodiment is located between the recess 504 and the rear end 506, and faces up. The joint portion 522 of the clamping member 52 is located above the screw hole 502. By this design, a screw S can also pass through the perforation 522a of the joint portion 522, and then be fastened to the screw hole 502, so as to fix the clamping member 52 to the casing 50.

Moreover, the clamping member 52 in this embodiment includes two convex blocks, a first convex block 524 and a second convex block 526, which are connected to the stop portion 528 and stretch to the recess wall 504a of the recess 504. The first convex block 524 is cuboid, while the second convex block 526 is a cylinder. The first convex block 524 and the second convex block 526 are provided for inserting holes on a game controller, such as charging or headphone jack, or alternatively, for abutting against the case of a game controller. By this structure, the case of a game controller can be confined by any of the convex blocks so that the external control device 4 can be fixed to the case of the game controller. Of course, the number of the convex blocks can be at least one.

From the above, the external control device is able to convert the button signal of the game controller into the wireless signal which corresponds to another game console. Thus, a player can operate the habitual game controller to play games with different game consoles, which makes the operation in the games easier. Furthermore, the battery of the external control device can be the external electric power to charge the storage battery of the game controller for longer battery life. Even if the storage battery is aging, the battery of the external control device can supply power to the storage battery, instead of replacing the storage battery or buying another game controller.

The external control device of each of the embodiments abovementioned is independent of the game controller, while the external control device and the game controller are connected to form the game control device. Another game control device will describe later, which integrates the game controller with the external control device.

Figure 11:
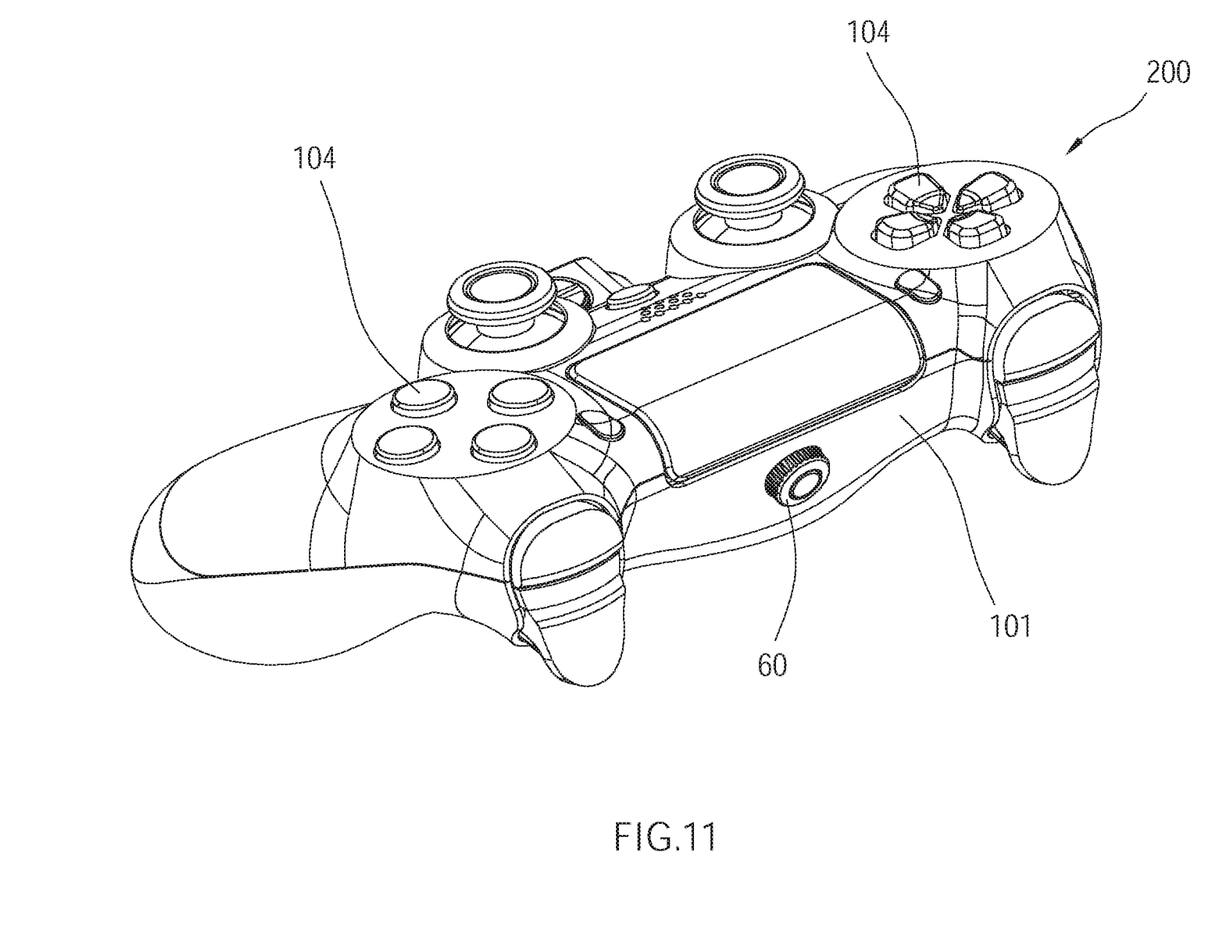
FIG. 11 is a perspective view of the game control device of the fifth preferred embodiment of the present invention.
Figure 12:
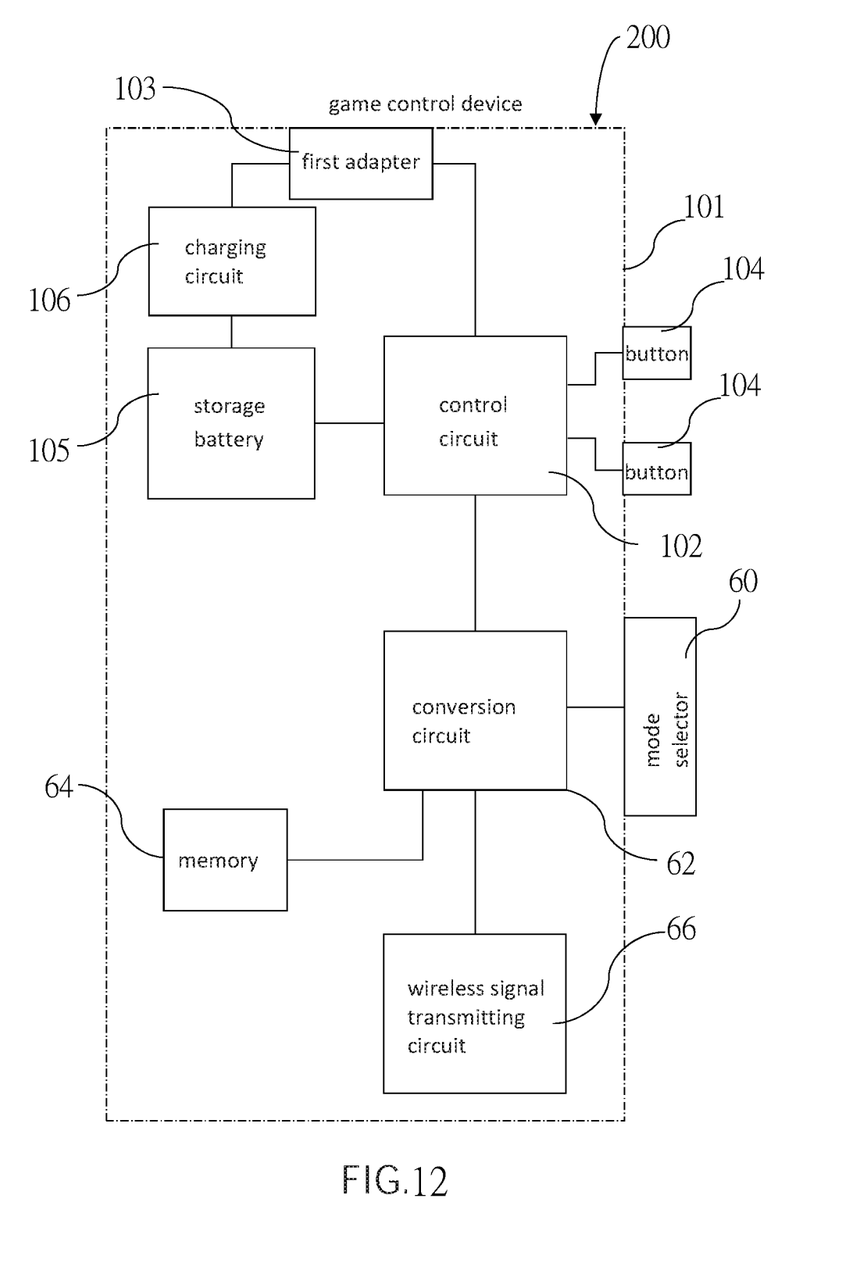
FIG. 12 is a block diagram of the game control device in FIG. 11.

As shown in FIG. 11 and FIG. 12, the fifth embodiment, a game control device 200, is based on the first embodiment, and also includes a case 101, a control circuit 102, a first adapter 103, a plurality of buttons 104, a storage battery 105, and a charging circuit 106. The difference between the two embodiments is that the game control device 200 further includes a mode selector 60, a conversion circuit, a memory, and a wireless signal transmitting circuit.

The mode selector 60 is provided on the case 101 for players to operate so as to send one of a plurality of selection signals. The memory 64 is provided in the case 101 to store a plurality of encode data. In this embodiment, the memory 64 is independent of the conversion circuit 62, but this is not a limitation of the present invention. The memory 64 can also be integrated with the conversion circuit 62 or the control circuit 102.

The conversion circuit 62 is provided in the case 101, and is electrically connected to the control circuit 102, the mode selector 60, and the memory 64. The conversion circuit 62 receives a button signal which corresponds to any of the buttons 104 from the control circuit 102, and selects one of the encode data in the memory 64 according to one of the selection signals output from the mode selector 60, and then encodes and converts the received button signal into a pre-formatted wireless signal according to the selected encode data, and finally sends the pre-formatted wireless signal through the wireless signal transmitting circuit 66.

The power required by the mode selector 60, the conversion circuit, the memory, and the wireless signal transmitting circuit can be supplied by the storage battery 105.

From the above, the game control device 200 can also send wireless signals corresponding to different game consoles.

Practically, the control circuit 102, the memory 64 and the conversion circuit 62 can be integrated into a circuit or a processor.

The embodiments described above are only preferred embodiments of the present invention. All equivalent structures which employ the concepts disclosed in this specification and the appended claims should fall within the scope of the present invention.

What is claimed is:

1. An external control device for a game controller which comprises a control circuit, a first adapter, and a plurality of buttons, wherein the control circuit is electrically connected to the first adapter and the plurality of buttons; according to a stressed state of each of the buttons, the control circuit generates a button signal corresponding to each of the buttons; the external control device comprises:
    a casing;
    a second adapter which is provided on the casing for being connected to the first adapter;
    a mode selector provided on the casing for users to operate so as to send one of a plurality of selection signals which are different;
    a memory provided in the casing for storing a plurality of encoded data; and
    a conversion circuit which is provided in the casing and electrically connected to the second adapter, the mode selector, and the memory, wherein the conversion circuit is electrically connected to the control circuit through the first adapter and the second adapter so as to receive the button signal corresponding to any of the buttons from the control circuit; according to one of the selection signals sent by the mode selector, the conversion circuit selects one of the encoded data, and then encodes and converts the button signal which is received into a pre-formatted wireless signal according to the encoded data which is selected, and finally sends the pre-formatted wireless signal through a wireless signal transmitting circuit.

2. The external control device of claim 1, further comprising a battery provided in the casing, wherein the battery is electrically connected to the conversion circuit and the second adapter; the battery supplies power to the conversion circuit; the power of the battery is output through the second adapter, and forms an external electric power for charging a storage battery in the game controller.

3. The external control device of claim 1, wherein the casing has a recess; after the second adapter and the first adapter are connected, a recess wall of the recess abuts against a case of the game controller.

4. The external control device of claim 1, further comprising a clamping member, wherein the casing has a recess which has a recess wall; the second adapter protrudes from the recess wall; the clamping member is connected to the casing, and has a stop portion which is opposite to the recess wall; the stop portion and the recess wall clamp a case of the game controller together.

5. The external control device of claim 4, wherein the clamping member is detachably connected to the casing.

6. The external control device of claim 4, wherein the clamping member has a joint portion which has a perforation; the casing has a screw hole thereon; the clamping member is fixed to the casing through a screw which passes the perforation of the joint portion and is fastened to the screw hole, wherein a head of the screw abuts against the joint portion.

7. The external control device of claim 6, wherein the clamping member comprises at least a convex block; the at least a convex block is connected to the stop portion, and stretches to the recess wall.

8. The external control device of claim 6, wherein an axis of the screw is parallel to a stretching direction of the second adapter.

9. The external control device of claim 4, wherein the clamping member is movable relative to the recess wall; the clamping member can move between a first position and a second position; when the clamping member is located in the first position, the stop portion and the recess wall hold the case of the game controller together; when the clamping member is located in the second position, the stop portion is spaced from the case.

10. The external control device of claim 9, wherein the casing has a penetration hole; the clamping member comprises a shaft rod passing through the penetration hole to stick in the casing; a return spring is fitted around the shaft rod; when the clamping member is pulled by an external force and located in the second position, the return spring is compressed; after the external force is removed, the return spring drives the clamping member to the first position.

11. The external control device of claim 1, further comprising a power source adapter which is electrically connected to the battery, wherein the battery is a storage battery; the power source adapter receives a power to charge the battery.

* * * * *